United States Patent
Lin et al.

(10) Patent No.: US 11,209,948 B2
(45) Date of Patent: Dec. 28, 2021

(54) TOUCH PANEL

(71) Applicant: Au Optronics Corporation, Hsinchu (TW)

(72) Inventors: Wei-Lin Lin, Hsinchu (TW); Yu-Feng Chien, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/729,510

(22) Filed: Dec. 30, 2019

(65) Prior Publication Data
US 2021/0064186 A1    Mar. 4, 2021

(30) Foreign Application Priority Data
Aug. 26, 2019  (TW) ................................ 108130455

(51) Int. Cl.
| G06F 3/044 | (2006.01) |
| G02F 1/1333 | (2006.01) |
| G02F 1/1335 | (2006.01) |
| G02F 1/1343 | (2006.01) |

(52) U.S. Cl.
CPC ........ *G06F 3/0446* (2019.05); *G02F 1/13338* (2013.01); *G02F 1/133528* (2013.01); *G02F 1/134309* (2013.01); *G02F 2201/50* (2013.01)

(58) Field of Classification Search
CPC .... G02F 1/13338; G06F 3/041; G06F 3/0412; G06F 3/044; G06F 3/0446
See application file for complete search history.

(56) References Cited

U.S. PATENT DOCUMENTS

| 9,164,636 B2 | 10/2015 | Kuo et al. | |
| 2010/0028811 A1* | 2/2010 | Geaghan | G06F 3/0446 |
| | | | 430/319 |
| 2013/0215053 A1 | 8/2013 | Lin et al. | |
| 2018/0059827 A1* | 3/2018 | Tanaka | G06F 3/0445 |

FOREIGN PATENT DOCUMENTS

| CN | 103257738 | | 8/2013 | |
| CN | 111253893 A | * | 6/2020 | |
| WO | WO-2014115831 A1 | * | 7/2014 | ............. G06F 3/047 |

* cited by examiner

*Primary Examiner* — Jessica M Merlin
(74) *Attorney, Agent, or Firm* — JCIPRNET (57) ABSTRACT

A touch panel including a liquid crystal panel, a first polarizer, touch units, and a second polarizer is provided. The liquid crystal panel includes a first substrate, a second substrate, an active array, and a liquid crystal layer. Each of the touch units includes a first electrode extending along a first extending direction and a second electrode extending along a second extending direction. The first electrode includes two of first touch electrodes electrically connected to each other. Each of the first touch electrodes has a first deviation amount in the second extending direction. The second electrode includes two of second touch electrodes electrically connected to each other. Each of the second touch electrodes has a second deviation amount in the first extending direction. The two of the second touch electrodes and the two of the first touch electrodes have four overlapping points.

20 Claims, 12 Drawing Sheets

TOUCH PANEL

CROSS-REFERENCE TO RELATED APPLICATION

This application claims the priority benefit of Taiwan application serial no. 108130455, filed on Aug. 26, 2019. The entirety of the above-mentioned patent application is hereby incorporated by reference herein and made a part of this specification.

TECHNICAL FIELD

The invention relates a touch panel, and more particularly, relates to a touch panel having a touch unit including two first touch electrodes and two touch electrodes.

BACKGROUND

With the advancement of technology, the appearance rate of touch panels in the market has gradually increased, and various related technologies have also emerged in an endless stream. In certain electronic devices (e.g., mobile phones, tablet computers, and smart watches), a touch panel and a display panel are often combined together to improve the convenience of the electronic devices in use.

In general, a touch substrate with touch function is additionally attached on a surface of the display panel so that the electronic device can provide both touch and display functions. For instance, an adhesive layer is used for bonding the display panel with the touch substrate. However, the electronic devices manufactured in this way will have thicker and heavier modules, and the overall module mechanism strength will be weaker.

SUMMARY

The invention provides a touch panel, which can reduce noise while maintaining touch signal strength.

At least one embodiment of the invention provides a touch panel. The touch panel includes a liquid crystal panel, a first polarizer, a touch device, and a second polarizer. The liquid crystal panel includes a first substrate, a second substrate, an active array, and a liquid crystal layer. The active array and the liquid crystal layer are disposed between the first substrate and the second substrate. The first polarizer is disposed on the first substrate. The touch device includes a plurality of touch units disposed on the second substrate. A width of each of the touch units in a first extending direction is X, and a width of each of the touch units in a second extending direction is Y. An area of each of the touch units perpendicularly projected on the second substrate is A. Each of the touch units includes a first electrode extending along a first extending direction and a second electrode extending along a second extending direction. The first electrode includes two of first touch electrodes electrically connected to each other. Each of the first touch electrodes has a first deviation amount in the second extending direction. The first deviation amount is greater than 0 and less than 0.2Y. An area of the first electrode perpendicularly projected on the second substrate is approximately 0.07 A to 0.25 A. The second electrode includes two of second touch electrodes electrically connected to each other. Each of the second touch electrodes has a second deviation amount in the first extending direction. The second deviation amount is greater than 0 and less than 0.2X. An area of the second electrode perpendicularly projected on the second substrate is approximately 0.07 A to 0.25 A. The two of the second touch electrodes and the two of the first touch electrodes have four overlapping points. The second polarizer is disposed on the touch units.

At least one embodiment of the invention provides a touch panel. The touch panel includes a liquid crystal panel, a first polarizer, a touch device, and a second polarizer. The liquid crystal panel includes a first substrate, a second substrate, an active array, and a liquid crystal layer. The active array and the liquid crystal layer are disposed between the first substrate and the second substrate. The first polarizer is disposed on the first substrate. The touch device includes a plurality of touch units disposed on the second substrate. A width of each of the touch units in a first extending direction is X, and a width of each of the touch units in a second extending direction is Y. Each of the touch units includes a first electrode extending along a first extending direction and a second electrode extending along a second extending direction. The first electrode includes two of first touch electrodes electrically connected to each other. The second electrode includes two of second touch electrodes electrically connected to each other. The two of the second touch electrodes and the two of the first touch electrodes have four overlapping points. A capacitance between the first electrode and the second electrode is 0.3 pF to 1.1 pF. The second polarizer is disposed on the touch units.

To make the aforementioned more comprehensible, several embodiments accompanied with drawings are described in detail as follows.

DESCRIPTION OF THE EMBODIMENTS

Figure 1A:
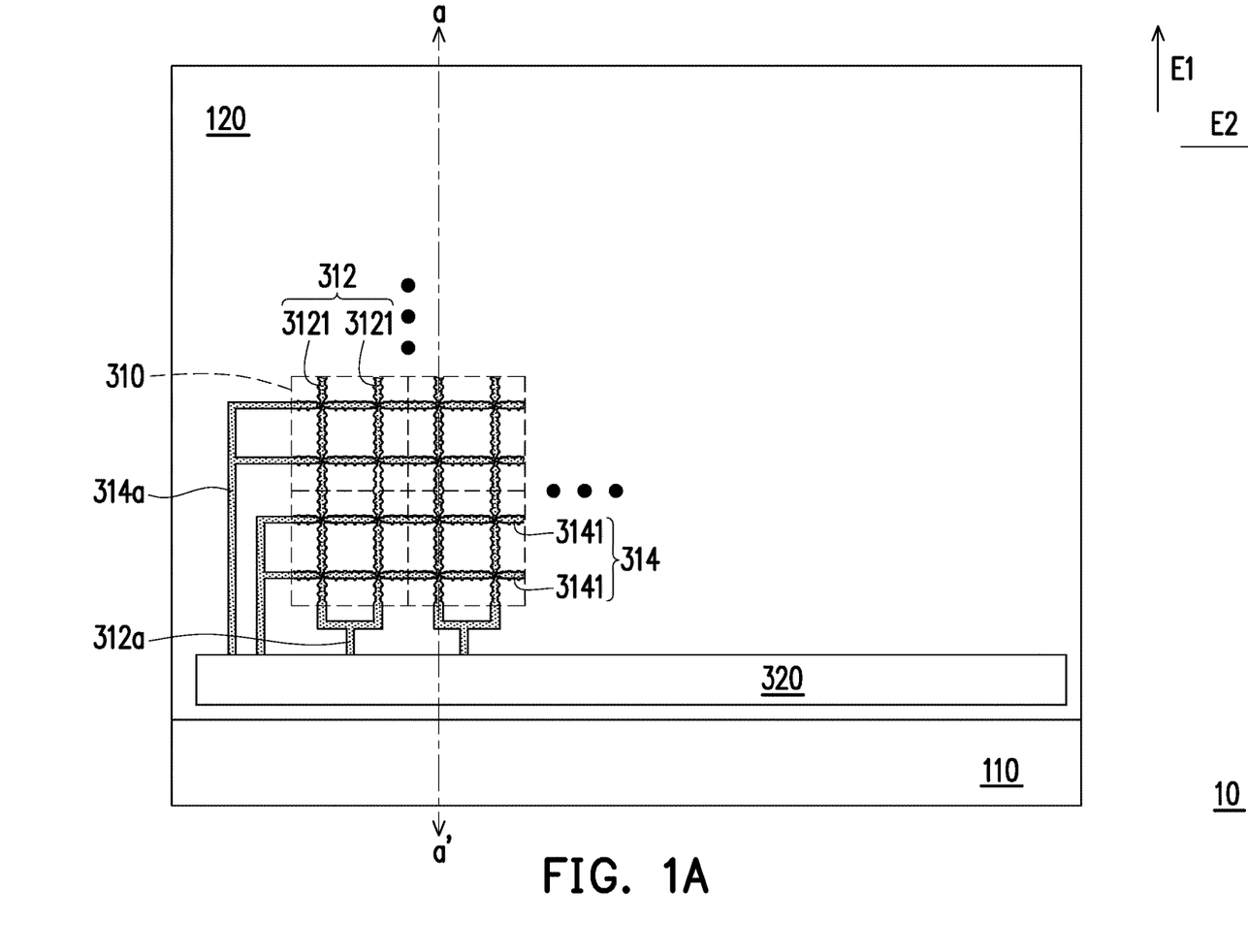
FIG. 1A is a top view of a touch panel according to an embodiment of the invention.
Figure 1B:
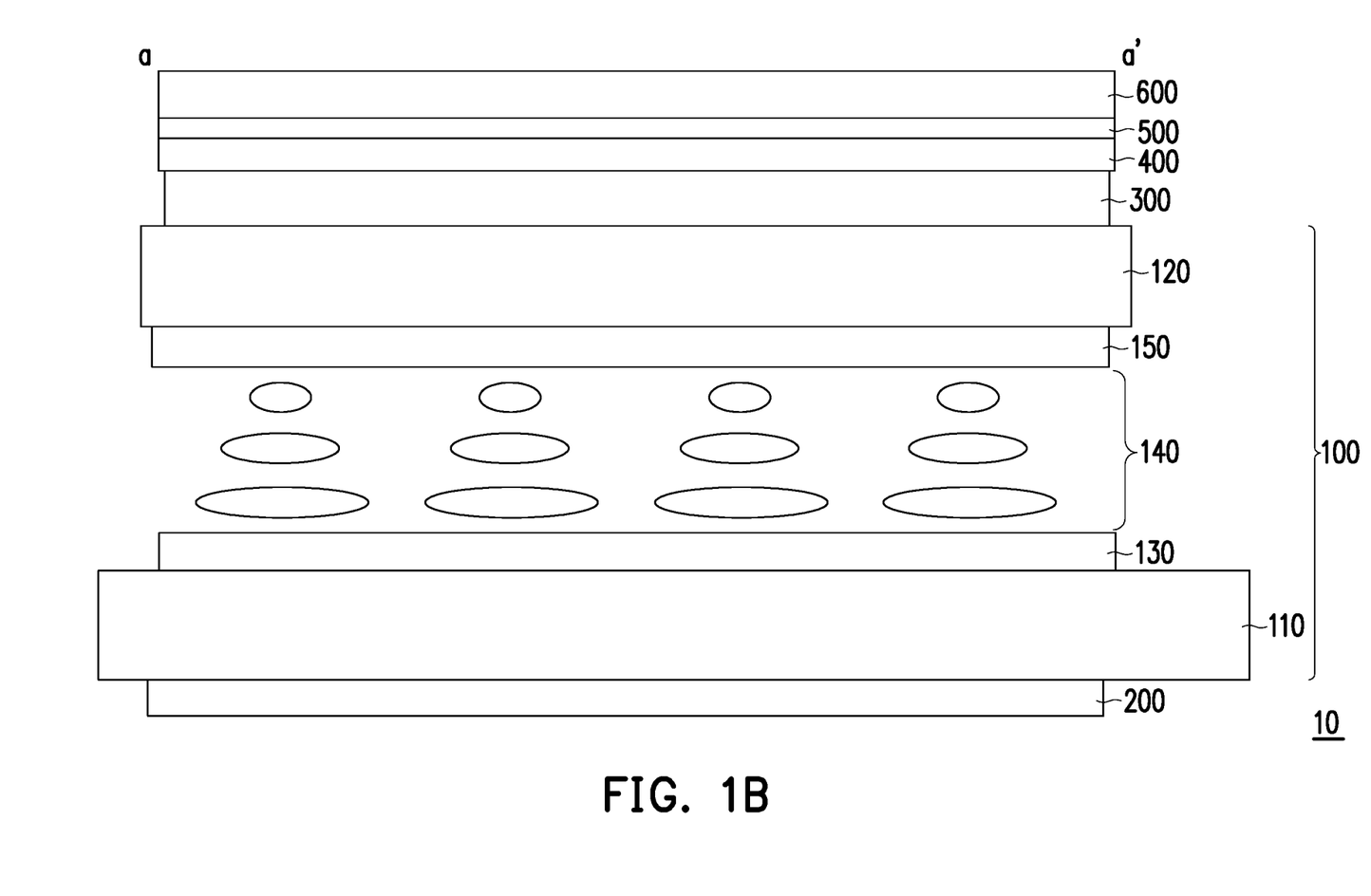
FIG. 1B is a cross-sectional view taken along a section line aa' of FIG. 1A.
Figure 1C:
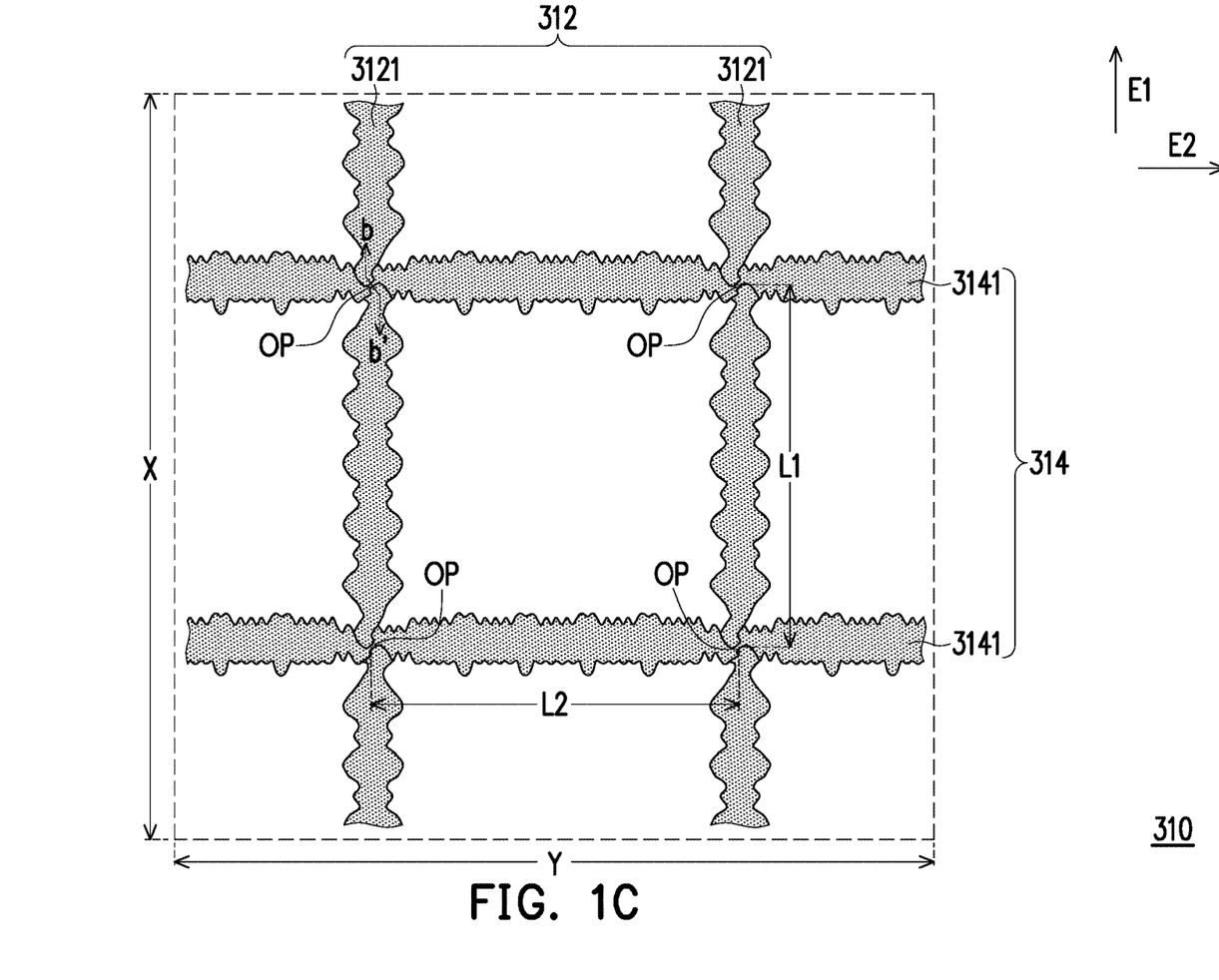
FIG. 1C is a top view of a touch unit in FIG. 1A.
Figure 1D:
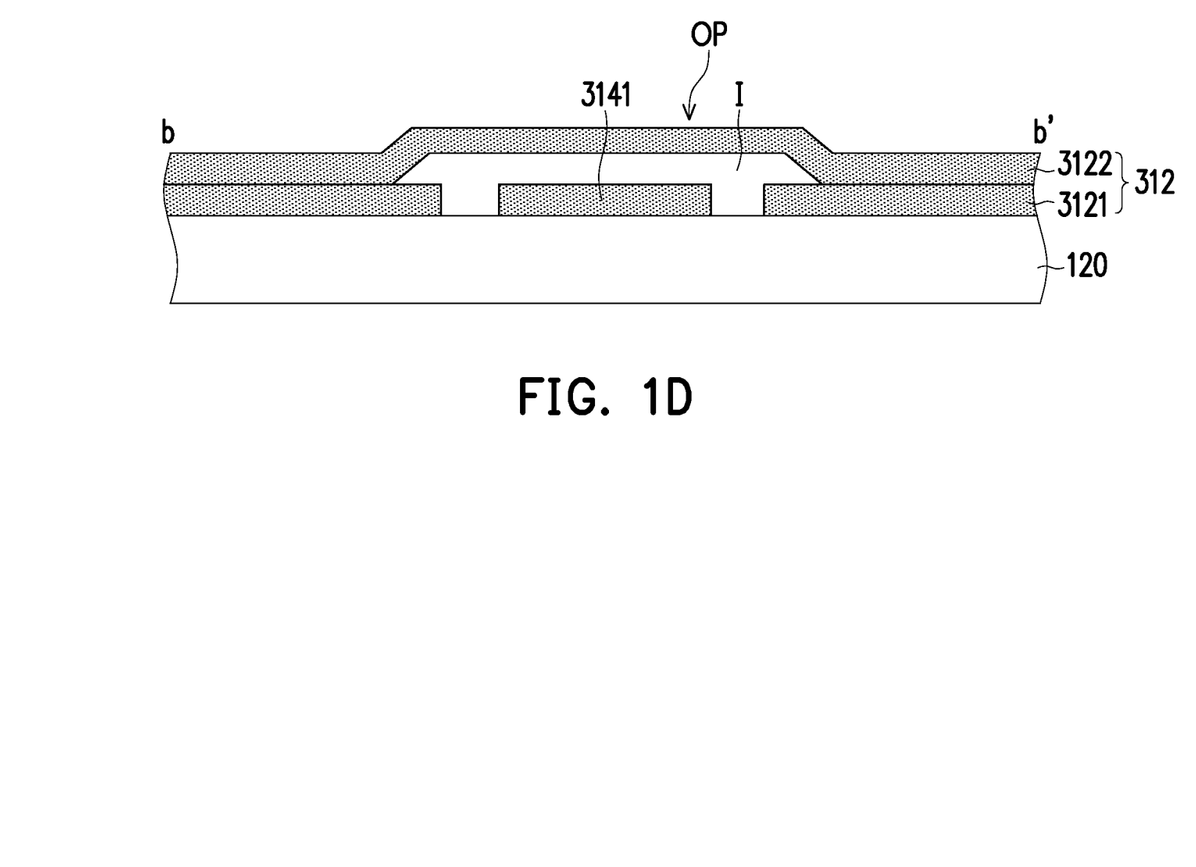
FIG. 1D is a cross-sectional view taken along a section line bb' of FIG. 1C.

FIG. 1A is a top view of a touch panel according to an embodiment of the invention. FIG. 1B is a cross-sectional view taken along a section line aa' of FIG. 1A. FIG. 1C is a top view of a touch unit in FIG. 1A. FIG. 1D is a cross-sectional view taken along a section line bb' of FIG. 1C. For descriptive convenience, FIG. 1A omits illustration of certain components in FIG. 1B, and FIG. 1B omits illustration of certain components in a touch device.

Referring to FIG. 1A and FIG. 1B, a touch panel 10 includes a liquid crystal panel 100, a first polarizer 200, a touch device 300, and a second polarizer 400.

The liquid crystal panel 100 includes a first substrate 110, a second substrate 120, an active array 130, and a liquid crystal layer 140. In this embodiment, the liquid crystal panel 100 further includes a color filter element 150.

The first substrate 110 and the second substrate 120 may be made of a glass, a quartz, an organic polymer, a non-transparent/reflective material or other suitable materials.

The active array 130 and the liquid crystal layer 140 are disposed between the first substrate 110 and the second substrate 120. In this embodiment, the active array 130 is disposed between the first substrate 110 and the liquid crystal layer 140. The active array 130 is, for example, a pixel array, and includes a plurality of sub-pixels. Each of the sub-pixels includes an active element and a pixel electrode electrically connected to the active element. A common electrode is disposed on the first substrate 110 or the second substrate 120, and controls liquid crystal molecules in the liquid crystal layer 140 by an electric field between the common electrode and the pixel electrode.

The color filter element 150 is disposed on the second substrate 120. In this embodiment, the color filter element 150 is located between the second substrate 120 and the liquid crystal layer 140, but the invention is not limited thereto. In other embodiments, the color filter element 150 is disposed on the active array 130 to form a color filter on array (COA) structure.

The first polarizer 200 is disposed on the first substrate 110. In this embodiment, the first substrate 110 is disposed between the first polarizer 200 and the active array 130.

The touch device 300 includes a plurality of touch units 310 disposed on the second substrate 120. In this embodiment, the touch device 300 further includes a control circuit 320. In other embodiments, the control circuit 320 is arranged on a flexible printed circuit board, the control circuit 320 is electrically connected to the control circuit 320 disposed on the flexible printed circuit board, and other chips or components may also be arranged on the flexible printed circuit board.

Referring to FIG. 1A and FIG. 1C, a width of each of the touch units 310 in a first extending direction E1 is X, and a width of each of the touch units 310 in a second extending direction E2 is Y. In this embodiment, an area of each of the touch units 310 perpendicularly projected on the second substrate 120 is A, and the area A is, for example, a product of the width X and the width Y. In this embodiment, X is 3 mm to 6 mm, and Y is 3 mm to 6 mm. In this embodiment, X and Y are equal to a sensor pitch of the touch units 310.

Each of the touch units 310 includes a first electrode 312 extending along the first extending direction E1 and a second electrode 314 extending along the second extending direction E2. In this embodiment, the first electrode 312 is a receiver electrode, and the second electrode 314 is a transmitter electrode. However, the invention is not limited this regard. In other embodiments, the first electrode 312 is the transmitter electrode, and the second electrode 314 is the receiver electrode. A shape of the first electrode 312 and a shape of the second electrode 314 may be identical to or different from each other.

The first electrode 312 includes two of first touch electrodes 3121 electrically connected to each other. In this embodiment, the two of the first touch electrodes 3121 electrically connected to each other are electrically connected to the control circuit 320 through the same signal line 312a. An area of the first electrode 312 perpendicularly projected on the second substrate 120 is approximately 0.07 A to 0.25 A. In certain embodiments, the first touch electrode 3121 includes a plurality of slits, but the invention is not limited thereto.

The second electrode 314 includes two of second touch electrodes 3141 electrically connected to each other. In this embodiment, the two of the second touch electrodes 3141 electrically connected to each other are electrically connected to the control circuit 320 through the same signal line 314a. An area of the second electrode 314 perpendicularly projected on the second substrate 120 is approximately 0.07 A to 0.25 A. In certain embodiments, the second touch electrode 3141 includes a plurality of slits, but the invention is not limited thereto.

Referring to FIG. 1C and FIG. 1D, in this embodiment, the first touch electrode 3121 includes a bridging unit 3122 (illustration of which is omitted in FIG. 1C), and the bridging unit 3122 is disposed at an intersection between the second touch electrode 3141 and the first touch electrode 3121. In this embodiment, an insulating layer I (illustration of which is omitted in FIG. 1C) is disposed on the intersection between the second touch electrode 3141 and the first touch electrode 3121, and the bridging unit 3122 is disposed on the insulating layer I. The bridging unit 3122 is disposed to allow the first electrode 312 to cross over the second electrode 314. In other embodiments, the second touch electrode 3141 includes a bridging unit, and the bridging unit is disposed to allow the second electrode 314 to cross over the first electrode 312.

The two of the second touch electrodes 3141 and the two of the first touch electrodes 3121 have four overlapping points OP. On each of the first touch electrodes 3121, a distance L1 between adjacent two of the overlapping points OP is 0.4X to 0.6X. On each of the second touch electrodes 3141, a distance L2 between adjacent two of the overlapping points OP is 0.4Y to 0.6Y.

In this embodiment, a capacitance between the first electrode 312 and the second electrode 314 is 0.3 pF to 1.1 pF. For instance, the capacitance (Cm) between the first electrode 312 and the second electrode 314 is approximately 0.433 pF to 0.434 pF, but the invention is not limited thereto.

In this embodiment, a parasitic capacitance (Cp) between the first electrode 312 and the liquid crystal panel 100 is approximately 0.496 pF, and a parasitic capacitance (Cp) between the second electrode 314 and the liquid crystal panel 100 is approximately 0.524 pF. However, the invention is not limited in this regard. In this embodiment, a capacitance (Cp+Cm) on the first electrode 312 is 0.8 pF to 1.5 pF, and a capacitance (Cp+Cm) on the second electrode 314 is 0.8 pF to 1.5 pF. For instance, the capacitance (Cp+Cm) on the first electrode 312 is 0.93 pF, and the capacitance (Cp+Cm) on the second electrode 314 is 0.957 pF.

Because the capacitance between the first electrode 312 and the second electrode 314 is 0.3 pF to 1.1 pF, it is possible to reduce noise on the first electrode 312 and the second electrode 314 while maintaining touch signal strength. Therefore, the touch panel 10 is not only suitable for touch control with fingers, but also suitable for touch control with an active capacitive stylus. In certain embodiments, because the capacitance on the first electrode 312 is 0.8 pF to 1.5 pF and the capacitance on the second electrode 314 is 0.8 pF to 1.5 pF, it is possible to further reduce noise on the first electrode 312 and the second electrode 314 and maintain touch signal strength.

The second polarizer 400 is disposed on the touch units 310. In this embodiment, the touch panel 10 further includes an adhesive layer 500 and a hardened layer 600. The adhesive layer 500 and the hardened layer 600 are disposed on the second polarizer 400, and the adhesive layer 500 is disposed between the hardened layer 600 and the second polarizer 400. In this embodiment, because the capacitance between the first electrode 312 and the second electrode 314 is 0.3 pF to 1.1 pF, the hardened layer 600 having a thickness thinner than that of a general cover lens may be used. For instance, a thickness of the hardened layer 600 is 80 μm to 120 μm. In other words, the touch panel 10 is suitable for a lightweight integrated touch panel (On-cell Touch Panellite). In other embodiments, the hardened layer 600 may also be replaced with a protective glass in the touch panel.

Figure 2:
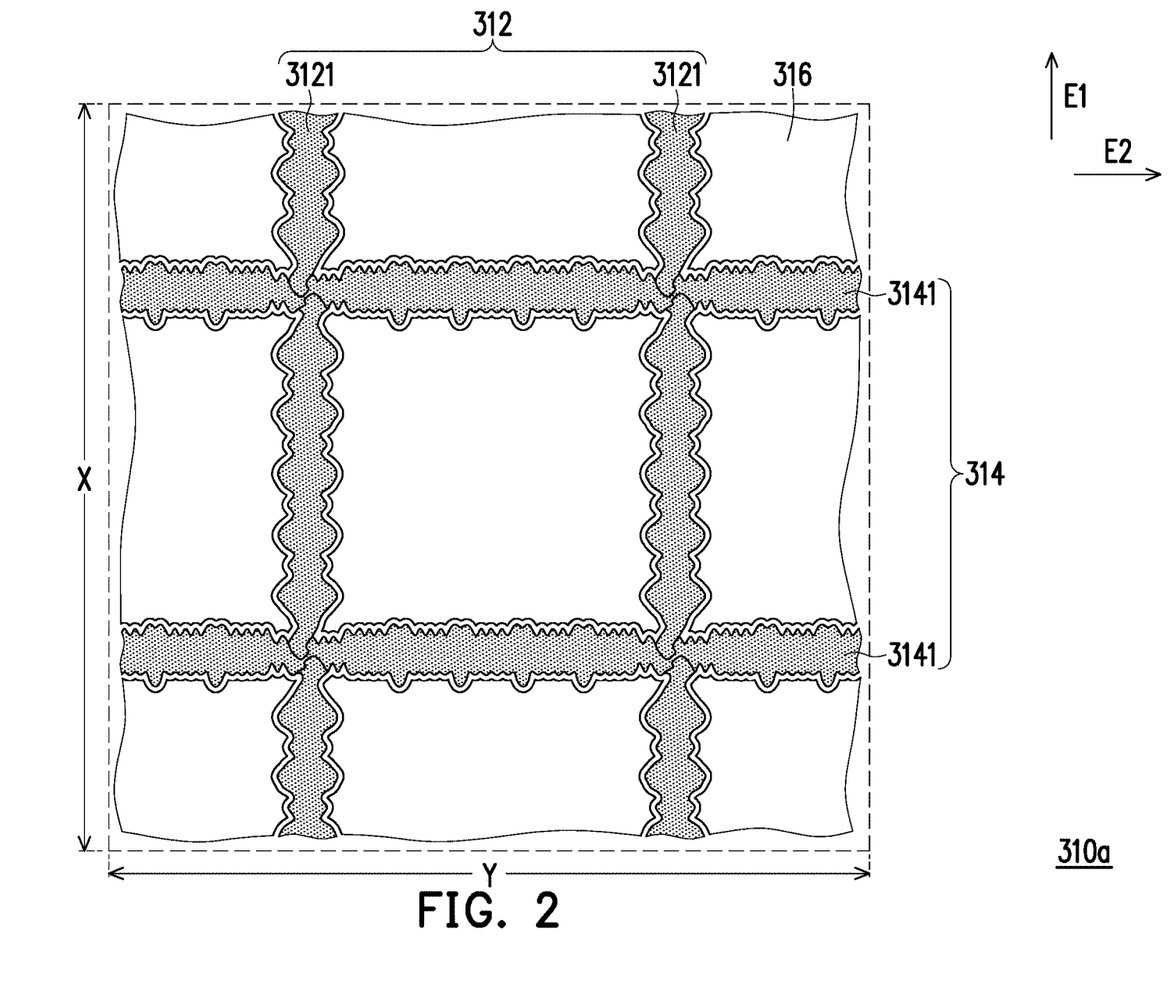
FIG. 2 is a top view of a touch unit according to an embodiment of the invention.

FIG. 2 is a top view of a touch unit according to an embodiment of the invention. It should be noted that, the embodiment of FIG. 2 adopts the reference numbers and part of the content in the embodiment of FIG. 1A to FIG. 1D, where identical or similar reference numbers are used to indicate identical or similar components, and repeated description for the same technical contents is omitted. The omitted description can refer to the foregoing embodiment, which is not repeated hereinafter.

The difference between a touch unit 310a in FIG. 2 and the touch unit 310 in FIG. 1C is that the touch unit 310a further includes a dummy electrode 316.

The dummy electrode 316 is separated from the first electrode 312 and the second electrode 314. In the touch unit 310a, an area of the dummy electrode 316 perpendicularly projected on the second substrate (referring to FIG. 1A) is approximately 0.5 A to 0.86 A. In certain embodiments, the first electrode 312, the second electrode 314 and the dummy electrode 316 are a combination of a transparent conductive oxide and a metal mesh. For instance, at least one of the first electrode 312, the second electrode 314 and the dummy electrode 316 is a multilayer structure, and is a stack of the transparent conductive oxide and the metal mesh. However, the invention is not limited in this regard. In other embodiments, the first electrode 312, the second electrode 314 and the dummy electrode 316 are a transparent conductive oxide. In certain embodiments, the dummy electrode 316 includes a plurality of slits, and the slits divide the dummy electrode 316 into a plurality of small fragments. In other words, the dummy electrode 316 disposed between the adjacent two of the second touch electrodes 3141 and between adjacent two of the first touch electrodes 3121 includes the small fragments and the slits that separate the small fragments.

In certain embodiments, the dummy electrode 316 affects the capacitance between the first electrode 312 and the second electrode 314. In this embodiment, the capacitance between the first electrode 312 and the second electrode 314 is 0.3 pF to 1.1 pF. For instance, the capacitance (Cm) between the first electrode 312 and the second electrode 314 is approximately 0.444 pF to 0.46 pF, but the invention is not limited thereto.

Figure 3:
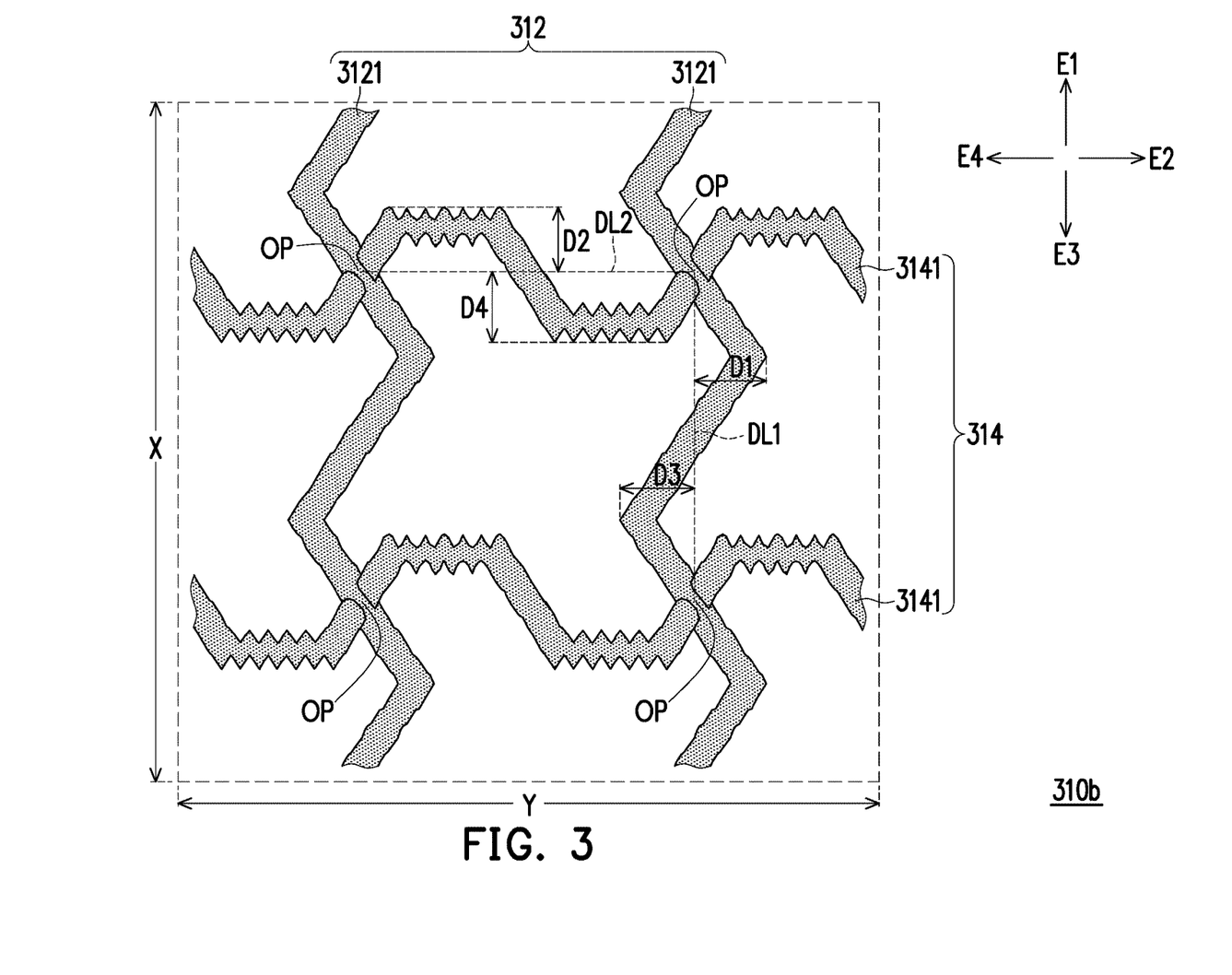
FIG. 3 is a top view of a touch unit according to an embodiment of the invention.

In this embodiment, a parasitic capacitance (Cp) between the first electrode 312, the liquid crystal panel 100 and the dummy electrode 316 is approximately 0.456 pF, and a parasitic capacitance (Cp) between the second electrode 314, the liquid crystal panel 100 and the dummy electrode 316 is approximately 0.512 pF. However, the invention is not limited in this regard. In this embodiment, the capacitance (Cp+Cm) on the first electrode 312 is 0.8 pF to 2 pF, and the capacitance (Cp+Cm) on the second electrode 314 is 0.8 pF to 2 pF. For instance, the capacitance (Cp+Cm) on the first electrode 312 is 0.9 pF, and the capacitance (Cp+Cm) on the second electrode 314 is 0.972 pF. FIG. 3 is a top view of a touch unit according to an embodiment of the invention. It should be noted that, the embodiment of FIG. 3 adopts the reference numbers and part of the content in the embodiment of FIG. 1A to FIG. 1D, where identical or similar reference numbers are used to indicate identical or similar components, and repeated description for the same technical contents is omitted. The omitted description can refer to the foregoing embodiment, which is not repeated hereinafter.

The difference between a touch unit 310b of FIG. 3 and the touch unit 310 of FIG. 1C is that the first touch electrode 3121 of the touch unit 310b has a first deviation amount D1 in the second extending direction E2, and the second touch electrode 3141 has a second deviation amount D2 in the first extending direction E1.

In this embodiment, the second touch electrode 3141 includes a bridging unit (not illustrated), and the bridging unit is disposed to allow the second electrode 314 to cross over the first electrode 312.

In this embodiment, the area of the first electrode 312 perpendicularly projected on the second substrate is approximately 0.07 A to 0.25 A (referring to FIG. 1A). A virtual straight line DL1 generated by connecting the adjacent two of the overlapping points OP on the first touch electrode 3121 is substantially parallel to the first extending direction E1, and the first touch electrodes 3121 deviate away from the virtual straight line DL1 starting from both sides of the virtual straight line DL1. In this embodiment, the first touch electrode 3121 has the deviation amount D1 in the second extending direction E2, and the first touch electrode 3121 has a deviation amount D3 in a fourth extending direction E4. Here, the second extending direction E2 is opposite to the fourth extending direction E4. The deviation amount D1 and the deviation amount D3 are greater than 0 and less than 0.2Y. The deviation amount D1 and the deviation amount D3 may be identical to or different from each other.

In this embodiment, the area of the second electrode 314 perpendicularly projected on the second substrate is approximately 0.07 A to 0.25 A (referring to FIG. 1A). A virtual straight line DL2 generated by connecting the adjacent two of the overlapping points OP on the second touch electrode 3141 is substantially parallel to the second extending direction E2, and the second touch electrodes 3141 deviate away from the virtual straight line DL2 starting from both sides of the virtual straight line DL2. More specifically, the second touch electrode 3141 has the deviation amount D2 in the first extending direction E1, and the second touch electrode 3141 has a deviation amount D4 in a third extending direction E3. Here, the first extending direction E1 is opposite to the third extending direction E3. The deviation amount D2 and the deviation amount D4 are greater than 0 and less than 0.2X. The deviation amount D2 and the deviation amount D4 may be identical to or different from each other.

Because the first touch electrode 3121 has the deviation amount D1 in the second extending direction E2 and the second touch electrode 3141 has the deviation amount D2 in the first extending direction E1, a capacitance distribution of the touch unit 310b is more uniform.

In this embodiment, the capacitance (Cm) between the first electrode 312 and the second electrode 314 is 0.3 pF to 1.1 pF. For instance, the capacitance (Cm) between the first electrode 312 and the second electrode 314 is approximately 0.56 pF to 0.561 pF, but the invention is not limited thereto.

In this embodiment, the parasitic capacitance (Cp) between the first electrode 312 and the liquid crystal panel 100 is approximately 0.665 pF, and the parasitic capacitance (Cp) between the second electrode 314 and the liquid crystal panel 100 is approximately 0.742 pF. However, the invention is not limited in this regard. In this embodiment, the capacitance (Cp+Cm) on the first electrode 312 is 0.8 pF to 1.5 pF, and the capacitance (Cp+Cm) on the second electrode 314 is 0.8 pF to 1.5 pF. For instance, the capacitance (Cp+Cm) on the first electrode 312 is 1.225 pF, and the capacitance (Cp+Cm) on the second electrode 314 is 1.303 pF.

Figure 4:
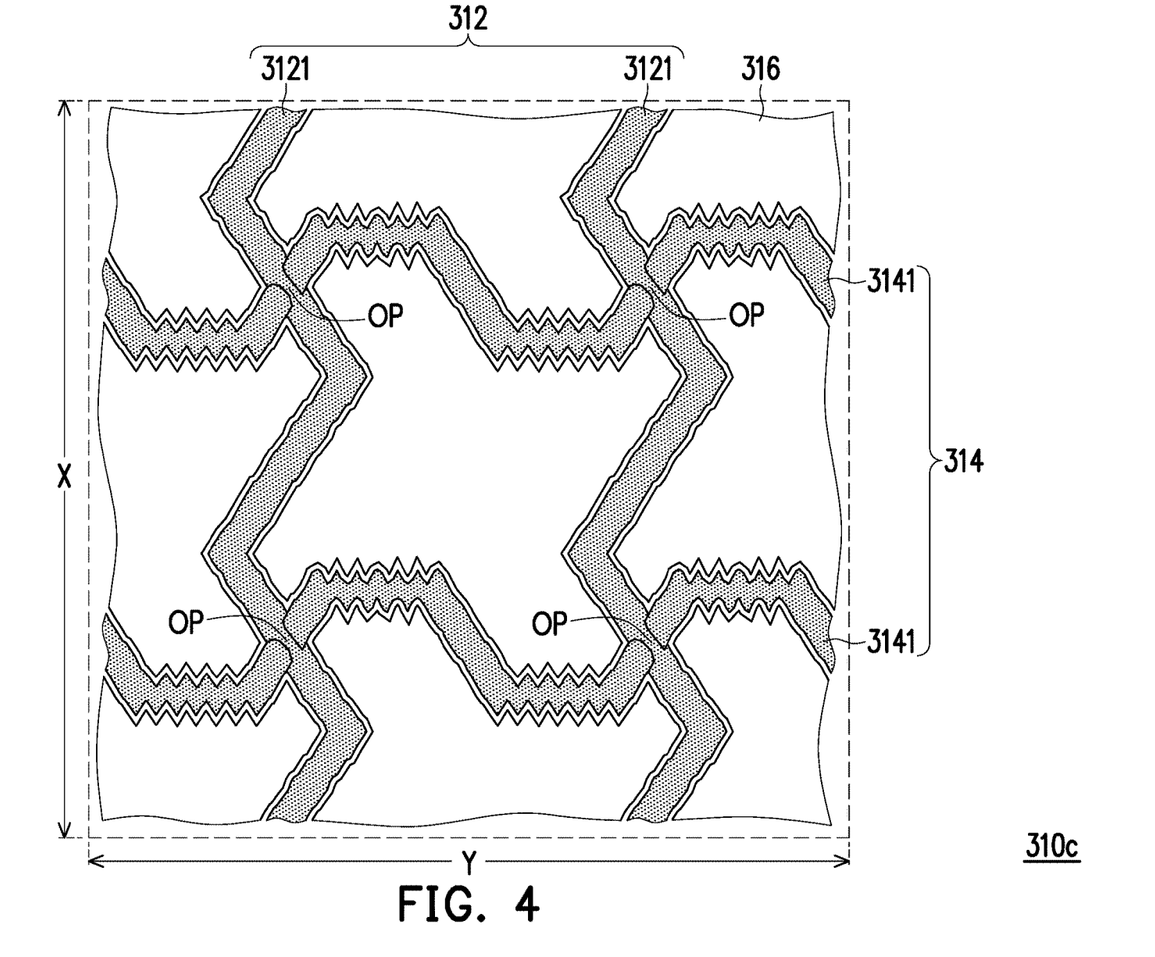
FIG. 4 is a top view of a touch unit according to an embodiment of the invention.

FIG. 4 is a top view of a touch unit according to an embodiment of the invention. It should be noted that the reference numerals and a part of the contents in the embodiment of FIG. 3 are also used to describe the embodiment of FIG. 4, in which the same reference numerals are used to represent identical or similar elements, and thus descriptions of the same technical contents are omitted. The omitted description can refer to the foregoing embodiment, which is not repeated hereinafter.

The difference between a touch unit 310c in FIG. 4 and the touch unit 310b in FIG. 3 is that the touch unit 310c further includes the dummy electrode 316.

The dummy electrode 316 is separated from the first electrode 312 and the second electrode 314. In the touch unit 310c, the area of the dummy electrode 316 perpendicularly projected on the second substrate (referring to FIG. 1A) is approximately 0.5 A to 0.86 A.

In this embodiment, the capacitance (Cm) between the first electrode 312 and the second electrode 314 is 0.3 pF to 1.1 pF. For instance, the capacitance (Cm) between the first electrode 312 and the second electrode 314 is approximately 0.724 pF to 1.099 pF, but the invention is not limited thereto.

In this embodiment, the parasitic capacitance (Cp) between the first electrode 312, the liquid crystal panel 100 and the dummy electrode 316 is approximately 0.855 pF, and the parasitic capacitance (Cp) between the second electrode 314, the liquid crystal panel 100 and the dummy electrode 316 is approximately 0.871 pF. However, the invention is not limited in this regard. In this embodiment, the capacitance (Cp+Cm) on the first electrode 312 is 0.8 pF to 2 pF, and the capacitance (Cp+Cm) on the second electrode 314 is 0.8 pF to 2 pF. For instance, the capacitance (Cp+Cm) on the first electrode 312 is 1.954 pF, and the capacitance (Cp+Cm) on the second electrode 314 is 1.595 pF.

In certain embodiments, the capacitances (Cp+Cm) on the first electrode 312 and the second electrode 314 can be adjusted by setting the dummy electrode 316 without increasing the areas of the first electrode 312 and the second electrode 314. Therefore, even if the capacitances (Cp+Cm) on the first electrode 312 and the second electrode 314 are large, the first electrode 312 and the second electrode 314 can still have small areas so that noise on the first electrode 312 and the second electrode 314 is smaller.

Figure 5:
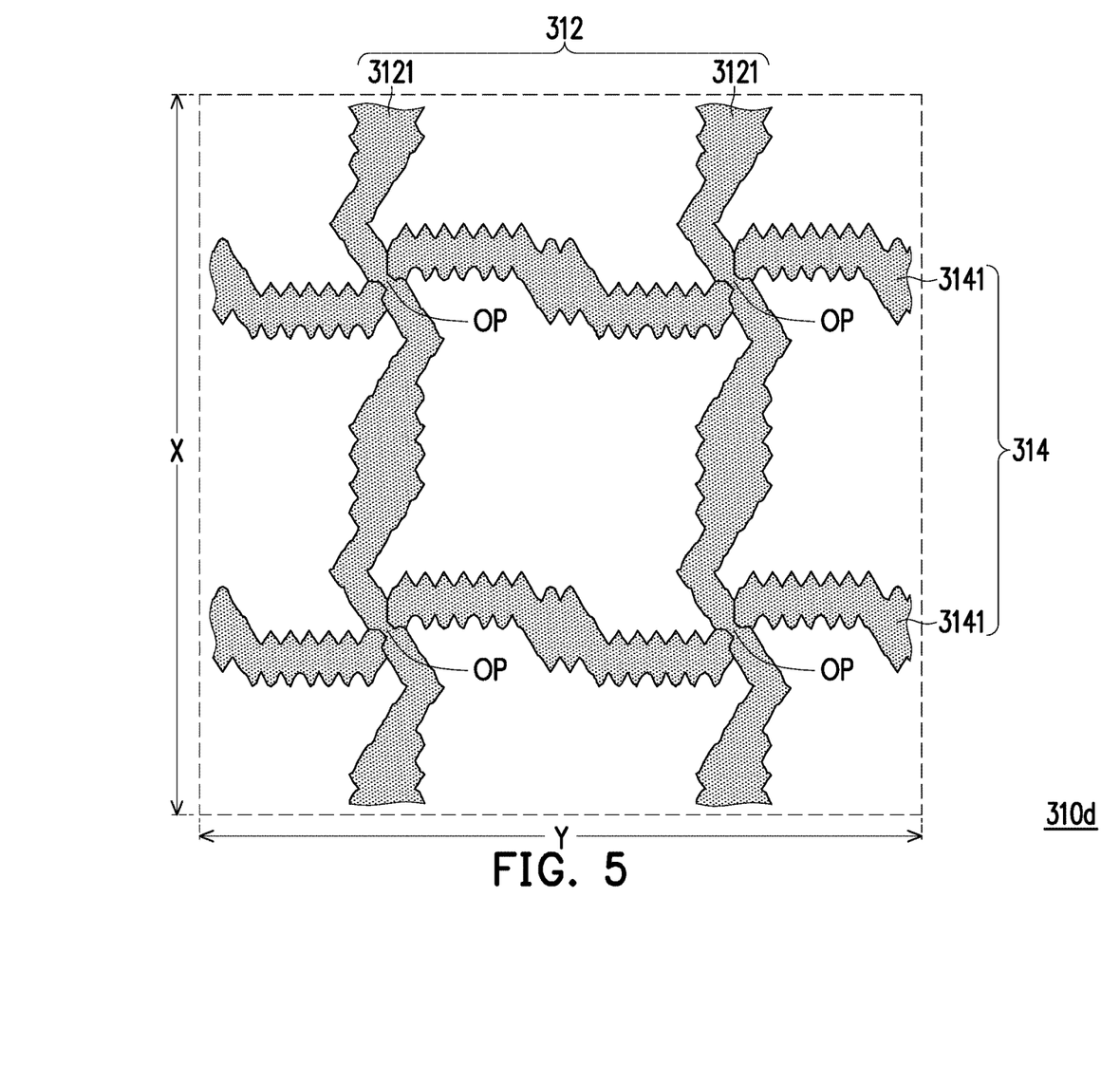
FIG. 5 is a top view of a touch unit according to an embodiment of the invention.

FIG. 5 is a top view of a touch unit according to an embodiment of the invention. It should be noted that the reference numerals and a part of the contents in the embodiment of FIG. 4 are also used to describe the embodiment of FIG. 5, in which the same reference numerals are used to represent identical or similar elements, and thus descriptions of the same technical contents are omitted. The omitted description can refer to the foregoing embodiment, which is not repeated hereinafter.

The difference between a touch unit 310d of FIG. 5 and the touch unit 310c of FIG. 4 is that shapes of the first electrode 312 and the second electrode 314 of the touch unit 310d are different from shapes of the first electrode 312 and the second electrode 314 of the touch unit 310c. The area A of the touch unit 310d is less than the area A of the touch unit 310c. The touch unit 310d in FIG. 5 and the touch unit 310c in FIG. 4 are not enlarged and drawn at the same scale.

In this embodiment, the area of the first electrode 312 perpendicularly projected on the second substrate is approximately 0.07 A to 0.25 A (referring to FIG. 1A). In this embodiment, the area of the second electrode 314 perpendicularly projected on the second substrate is approximately 0.07 A to 0.25 A (referring to FIG. 1A).

In this embodiment, the capacitance (Cm) between the first electrode 312 and the second electrode 314 is 0.3 pF to 1.1 pF. For instance, the capacitance (Cm) between the first electrode 312 and the second electrode 314 is approximately 0.542 pF to 0.543 pF, but the invention is not limited thereto.

In this embodiment, the parasitic capacitance (Cp) between the first electrode 312 and the liquid crystal panel 100 is approximately 0.584 pF, and the parasitic capacitance (Cp) between the second electrode 314 and the liquid crystal panel 100 is approximately 0.634 pF. However, the invention is not limited in this regard. In this embodiment, the capacitance (Cp+Cm) on the first electrode 312 is 0.8 pF to 1.5 pF, and the capacitance (Cp+Cm) on the second electrode 314 is 0.8 pF to 1.5 pF. For instance, the capacitance on the first electrode 312 is 1.127 pF, and the capacitance on the second electrode 314 is 1.176 pF.

Figure 6:
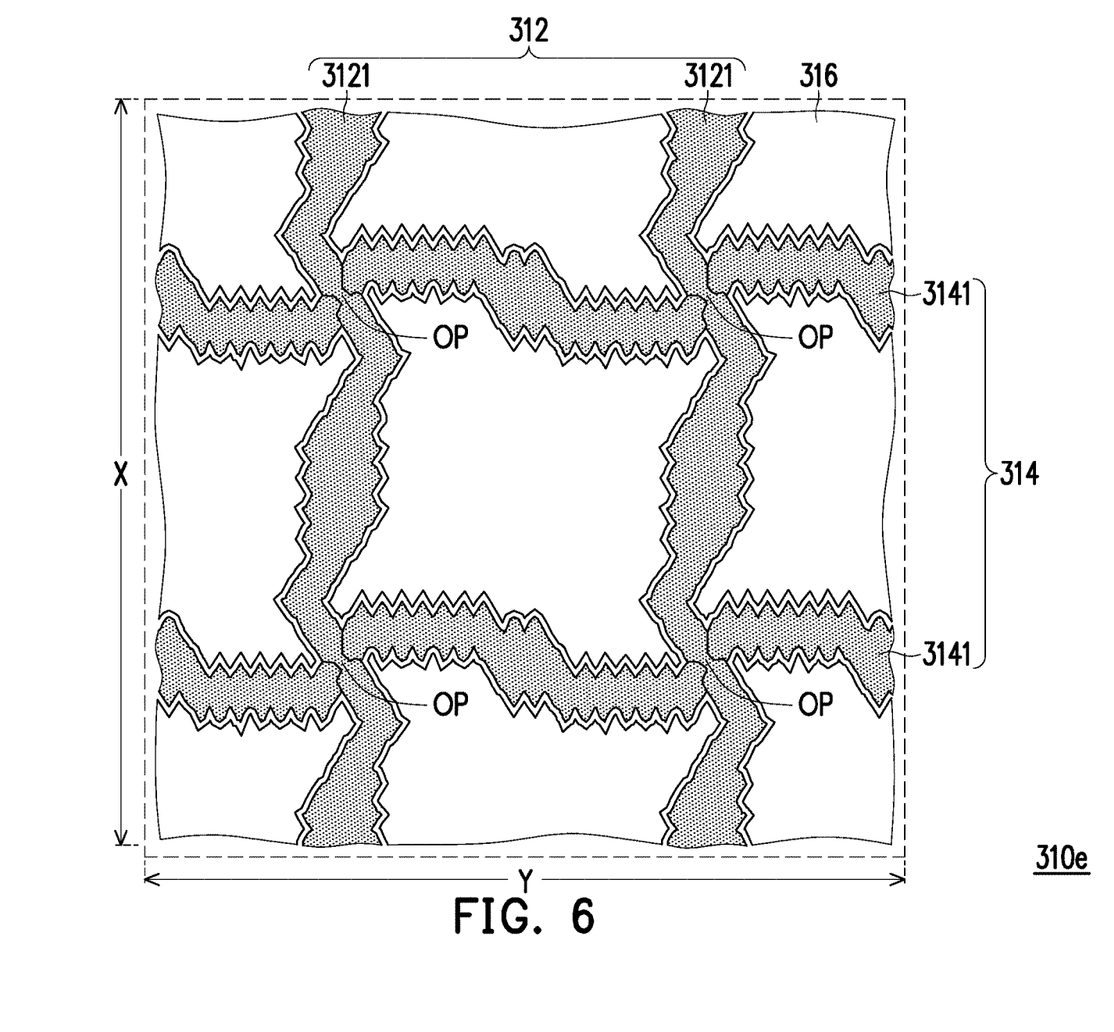
FIG. 6 is a top view of a touch unit according to an embodiment of the invention.

FIG. 6 is a top view of a touch unit according to an embodiment of the invention. It should be noted that the reference numerals and a part of the contents in the embodiment of FIG. 5 are also used to describe the embodiment of FIG. 6, in which the same reference numerals are used to represent identical or similar elements, and thus descriptions of the same technical contents are omitted. The omitted description can refer to the foregoing embodiment, which is not repeated hereinafter.

The difference between a touch unit 310e in FIG. 6 and the touch unit 310d in FIG. 5 is that the touch unit 310e further includes the dummy electrode 316.

The dummy electrode 316 is separated from the first electrode 312 and the second electrode 314. In the touch unit 310e, the area of the dummy electrode 316 perpendicularly projected on the second substrate (referring to FIG. 1A) is approximately 0.5 A to 0.86 A.

In this embodiment, the capacitance between the first electrode 312 and the second electrode 314 is 0.3 pF to 1.1 pF. For instance, the capacitance (Cm) between the first electrode 312 and the second electrode 314 is approximately 0.713 pF to 0.853 pF, but the invention is not limited thereto.

In this embodiment, the parasitic capacitance (Cp) between the first electrode 312, the liquid crystal panel 100 and the dummy electrode 316 is approximately 0.668 pF, and the parasitic capacitance (Cp) between the second electrode 314, the liquid crystal panel 100 and the dummy electrode 316 is approximately 0.721 pF. However, the invention is not limited in this regard. In this embodiment, the capacitance (Cp+Cm) on the first electrode 312 is 0.8 pF to 2 pF, and the capacitance (Cp+Cm) on the second electrode 314 is 0.8 pF to 2 pF. For instance, the capacitance on the first electrode 312 is 1.521 pF, and the capacitance on the second electrode 314 is 1.434 pF.

Figure 7:
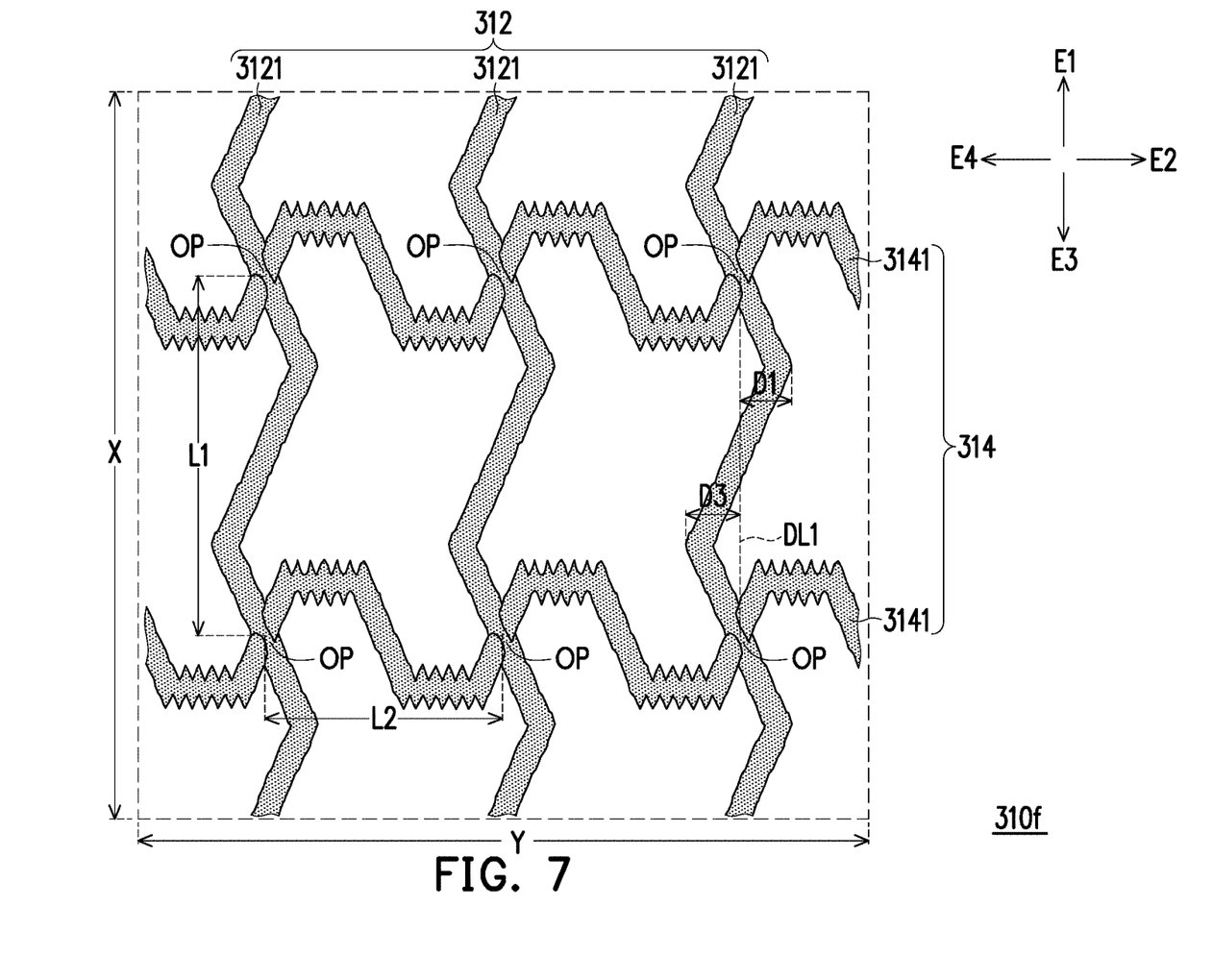
FIG. 7 is a top view of a touch unit according to an embodiment of the invention.

FIG. 7 is a top view of a touch unit according to an embodiment of the invention. It should be noted that the reference numerals and a part of the contents in the embodiment of FIG. 6 are also used to describe the embodiment of FIG. 7, in which the same reference numerals are used to represent identical or similar elements, and thus descriptions of the same technical contents are omitted. The omitted description can refer to the foregoing embodiment, which is not repeated hereinafter.

The difference between a touch unit 310f of FIG. 7 and the touch unit 310e of FIG. 6 is that shapes of the first electrode 312 and the second electrode 314 of the touch unit 310f are different from shapes of the first electrode 312 and the second electrode 314 of the touch unit 310e.

In this embodiment, a sensor pitch of the touch unit 310f (e.g., the width X and the width Y) is greater than 4.5 mm.

Two of the second touch electrodes 3141 and three of the first touch electrodes 3121 have six overlapping points OP. On each of the first touch electrodes 3121, the distance L1 between adjacent two of the overlapping points OP is 0.4X to 0.6X. On each of the second touch electrodes 3141, the distance L2 between adjacent two of the overlapping points OP is 0.2Y to 0.4Y, and more preferably, 0.33Y.

In this embodiment, the first touch electrode 3121 has the deviation amount D1 in the second extending direction E2, and the first touch electrode 3121 has the deviation amount D3 in the fourth extending direction E4. The deviation amount D1 and the deviation amount D3 are greater than 0 and less than 0.15Y.

Because the first electrode 312 includes three or more of the first touch electrodes 3121 electrically connected to each other, touch uniformity and touch accuracy of the touch panel can be improved.

Figure 8:
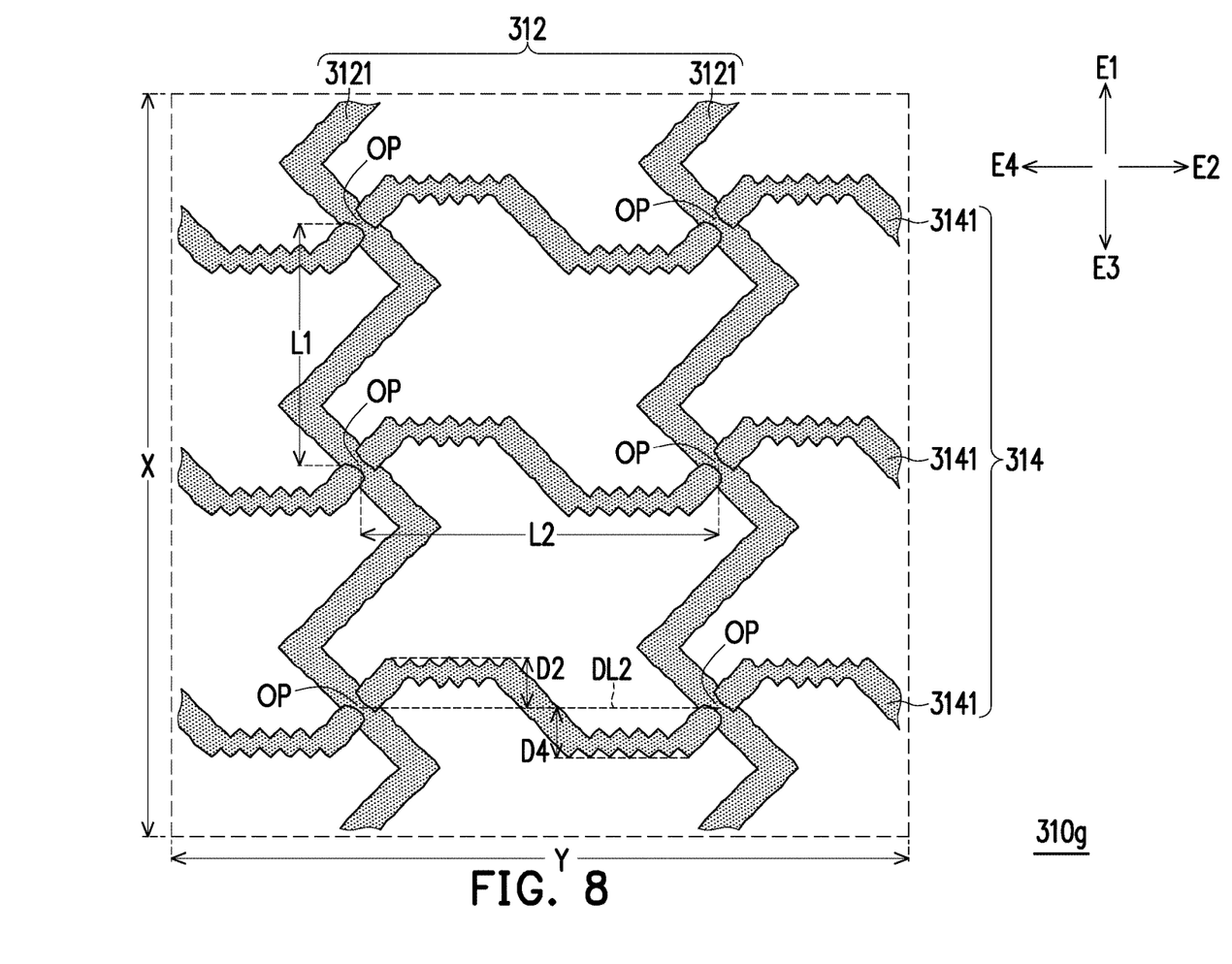
FIG. 8 is a top view of a touch unit according to an embodiment of the invention.

FIG. 8 is a top view of a touch unit according to an embodiment of the invention. It should be noted that the reference numerals and a part of the contents in the embodiment of FIG. 6 are also used to describe the embodiment of FIG. 8, in which the same reference numerals are used to represent identical or similar elements, and thus descriptions of the same technical contents are omitted. The omitted description can refer to the foregoing embodiment, which is not repeated hereinafter.

The difference between a touch unit 310g of FIG. 8 and the touch unit 310e of FIG. 6 is that shapes of the first electrode 312 and the second electrode 314 of the touch unit 310g are different from shapes of the first electrode 312 and the second electrode 314 of the touch unit 310e.

In this embodiment, a sensor pitch of the touch unit 310g (e.g., the width X and the width Y) is greater than 4.5 mm.

Three of the second touch electrodes 3141 and two of the first touch electrodes 3121 have six overlapping points OP. On each of the first touch electrodes 3121, the distance L1 between adjacent two of the overlapping points OP is 0.2X to 0.4X, and more preferably, 0.33X.

On each of the second touch electrodes 3141, the distance L2 between adjacent two of the overlapping points OP is 0.4Y to 0.6Y.

In this embodiment, the second touch electrode 3141 has the deviation amount D2 in the first extending direction E1, and the second touch electrode 3141 has the deviation amount D4 in the third extending direction E3. The deviation amount D2 and the deviation amount D4 are greater than 0 and less than 0.15X.

Because the second electrode 314 includes three or more of the second touch electrodes 3141 electrically connected to each other, touch uniformity and touch accuracy of the touch panel can be improved.

Figure 9:
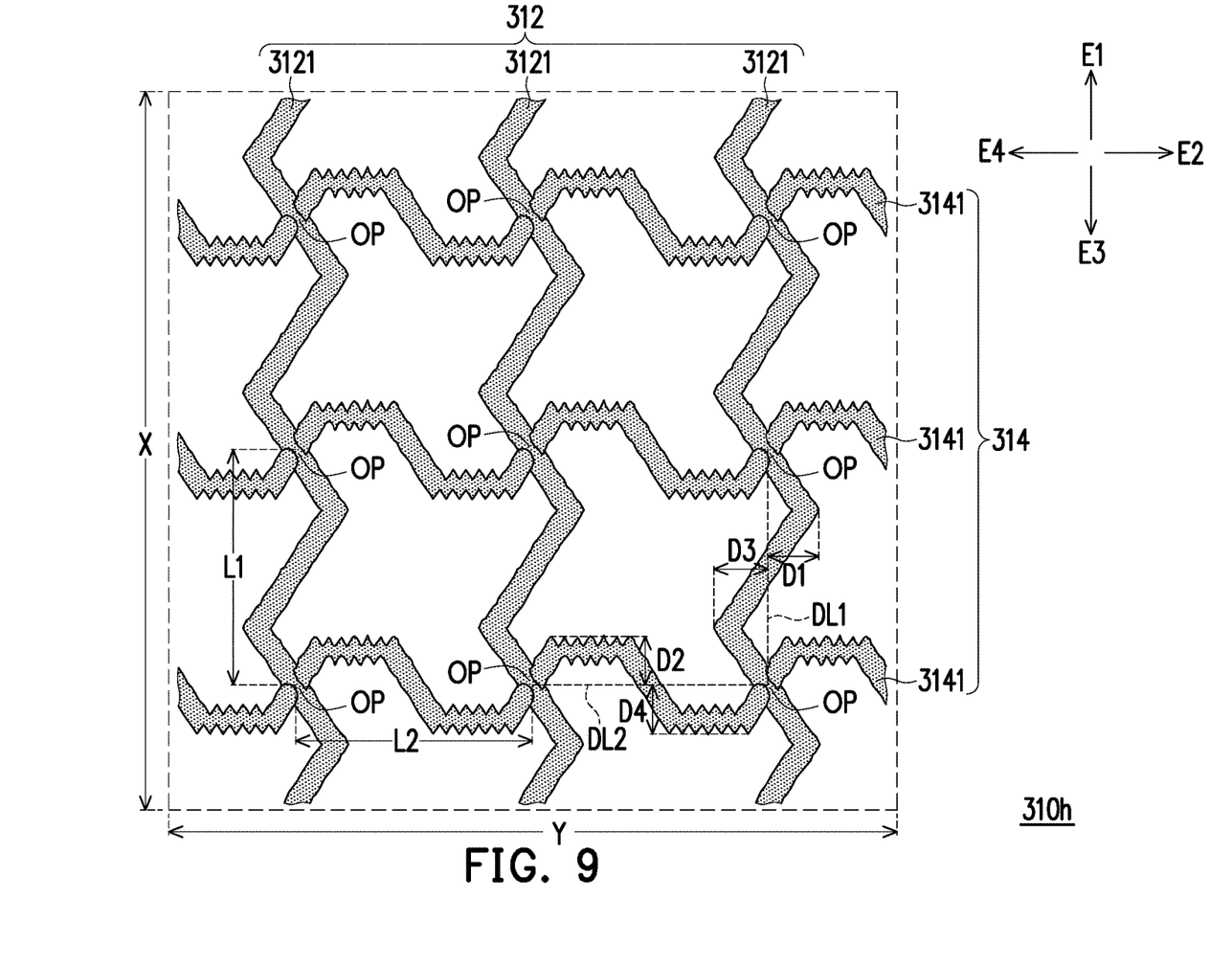
FIG. 9 is a top view of a touch unit according to an embodiment of the invention.

FIG. 9 is a top view of a touch unit according to an embodiment of the invention. It should be noted that the reference numerals and a part of the contents in the embodiment of FIG. 8 are also used to describe the embodiment of FIG. 9, in which the same reference numerals are used to represent identical or similar elements, and thus descriptions of the same technical contents are omitted. The omitted description can refer to the foregoing embodiment, which is not repeated hereinafter.

The difference between a touch unit 310h of FIG. 9 and the touch unit 310g of FIG. 8 is that shapes of the first electrode 312 and the second electrode 314 of the touch unit 310h are different from shapes of the first electrode 312 and the second electrode 314 of the touch unit 310g.

In this embodiment, a sensor pitch of the touch unit 310h (e.g., the width X and the width Y) is greater than 4.5 mm.

Three of the second touch electrodes 3141 and three of the first touch electrodes 3121 have nine overlapping points OP. On each of the first touch electrodes 3121, the distance L1 between adjacent two of the overlapping points OP is 0.2X to 0.4X, and more preferably, 0.33X. On each of the second touch electrodes 3141, the distance L2 between adjacent two of the overlapping points OP is 0.2Y to 0.4Y, and more preferably, 0.33Y.

In this embodiment, the first touch electrode 3121 has the deviation amount D1 in the second extending direction E2, and the first touch electrode 3121 has the deviation amount D3 in the fourth extending direction E4. The deviation amount D1 and the deviation amount D3 are greater than 0 and less than 0.15Y. In this embodiment, the second touch electrode 3141 has the deviation amount D2 in the first extending direction E1, and the second touch electrode 3141 has the deviation amount D4 in the third extending direction E3. The deviation amount D2 and the deviation amount D4 are greater than 0 and less than 0.15X.

Because the first electrode 312 includes three or more of the first touch electrodes 3121 electrically connected to each other and the second electrode 314 includes three or more of the second touch electrodes 3141 electrically connected to each other, touch uniformity and touch accuracy of the touch panel can be improved.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A touch panel, comprising:
    a liquid crystal panel, comprising:
        a first substrate and a second substrate;
        an active array, disposed between the first substrate and the second substrate; and
        a liquid crystal layer, disposed between the first substrate and the second substrate;
    a first polarizer, disposed on the first substrate;
    a touch device, comprising a plurality of touch units, and disposed on the second substrate, wherein a width of each of the touch units in a first extending direction is X, a width of each of the touch units in a second extending direction is Y, an area of each of the touch units perpendicularly projected on the second substrate is A, and each of the touch units comprises:
        a first electrode, extending along the first extending direction, and comprising two of first touch electrodes electrically connected to each other, wherein each of the first touch electrodes has a first deviation amount in the second extending direction, and the first deviation amount is greater than 0 and less than 0.2Y, wherein an area of the first electrode perpendicularly projected on the second substrate is approximately 0.07A to 0.25A, wherein each of the first electrode and the second electrode comprises a transparent conductive oxide; and a second electrode, extending along the second extending direction, and comprising two of second touch electrodes electrically connected to each other, wherein each of the second touch electrodes has a second deviation amount in the first extending direction, and the second deviation amount is greater than 0 and less than 0.2X, wherein an area of the second electrode perpendicularly projected on the second substrate is approximately 0.07A to 0.25A, wherein the two of the second touch electrodes and the two of the first touch electrodes have four overlapping points; and a second polarizer, disposed on the touch units.

2. The touch panel according to claim 1, wherein a capacitance between the first electrode and the second electrode of each of the touch units is 0.3 pF to 1.1 pF.

3. The touch panel according to claim 1, wherein
the first electrode comprises three or more of the first touch electrodes electrically connected to each other or
the second electrode comprises three or more of the second touch electrodes electrically connected to each other.

4. The touch panel according to claim 1, wherein a total value of a mutual capacitance between the first electrode and the second electrode and a parasitic capacitance between the first electrode and the liquid crystal panel is 0.8 pF to 1.5 pF, and a total value of a mutual capacitance between the first electrode and the second electrode and a parasitic capacitance between the second electrode and the liquid crystal panel is 0.8 pF to 1.5 pF.

5. The touch panel according to claim 1, wherein on each of the first touch electrodes, a distance between adjacent two of the overlapping points is 0.4X to 0.6X.

6. The touch panel according to claim 1, wherein on each of the second touch electrodes, a distance between adjacent two of the overlapping points is 0.4Y to 0.6Y.

7. The touch panel according to claim 1, wherein X is 3 mm to 6 mm, and Y is 3 mm to 6 mm.

8. The touch panel according to claim 1, wherein each of the touch units further comprises:
a dummy electrode, separated from the first electrode and the second electrode, wherein a capacitance between the first electrode and the second electrode is 0.3 pF to 1.1 pF, a total value of a mutual capacitance between the first electrode and the second electrode, a parasitic capacitance between the first electrode and the liquid crystal panel, and a parasitic capacitance between the first electrode and the dummy electrode is 0.8 pF to 2 pF, and a total value of a mutual capacitance between the first electrode and the second electrode, a parasitic capacitance between the second electrode and the liquid crystal panel, and a parasitic capacitance between the second electrode and the dummy electrode is 0.8 pF to 2 pF.

9. The touch panel according to claim 8, wherein in each of the touch units, an area of the dummy electrode perpendicularly projected on the second substrate is approximately 0.5A to 0.86A.

10. The touch panel of claim 1, further comprising:
a hardened layer, disposed on the second polarizer, and a thickness of the hardened layer is 80 μm to 120 μm.

11. A touch panel, comprising:
a liquid crystal panel, comprising:
a first substrate and a second substrate;
an active array, disposed between the first substrate and the second substrate; and a liquid crystal layer, disposed between the first substrate and the second substrate;
a first polarizer, disposed on the first substrate;
a touch device, comprising a plurality of touch units, and disposed on the second substrate, wherein a width of each of the touch units in a first extending direction is X, a width of each of the touch units in a second extending direction is Y, and each of the touch units comprises:
a first electrode, extending along the first extending direction, and comprising two of first touch electrodes electrically connected to each other; and
a second electrode, extending along the second extending direction, and comprising two of second touch electrodes electrically connected to each other, wherein the two of the second touch electrodes and the two of the first touch electrodes have four overlapping points, wherein a mutual capacitance between the first electrode and the second electrode is 0.3 pF to 1.1 pF; and
a second polarizer, disposed on the touch units.

12. The touch panel according to claim 11, wherein an area of each of the touch units perpendicularly projected on the second substrate is A, an area of the first electrode perpendicularly projected on the second substrate is approximately 0.07A to 0.25A, and an area of the second electrode perpendicularly projected on the second substrate is approximately 0.07A to 0.25A.

13. The touch panel according to claim 12, wherein
the first electrode comprises three or more of the first touch electrodes electrically connected to each other or
the second electrode comprises three or more of the second touch electrodes electrically connected to each other.

14. The touch panel according to claim 11, wherein each of the first touch electrodes has a first deviation amount in the second extending direction, the first deviation amount is greater than 0 and less than 0.2Y, each of the second touch electrodes has a second deviation amount in the first extending direction, and the second deviation amount is greater than 0 and less than 0.2X.

15. The touch panel according to claim 11, wherein on each of the first touch electrodes, a distance between adjacent two of the overlapping points is 0.4X to 0.6X.

16. The touch panel according to claim 11, wherein on each of the second touch electrodes, a distance between adjacent two of the overlapping points is 0.4Y to 0.6Y.

17. The touch panel according to claim 11, wherein X is 3 min to 6 mm, and Y is 3 mm to 6 mm.

18. The touch panel according to claim 11, wherein each of the touch units further comprises:
a dummy electrode, separated from the first electrode and the second electrode, wherein a capacitance between the first electrode and the second electrode is 0.3 pF to 1.1 pF, a total value of a mutual capacitance between the first electrode and the second electrode, a parasitic capacitance between the first electrode and the liquid crystal panel, and a parasitic capacitance between the first electrode and the dummy electrode is 0.8 pF to 2 pF, and a a total value of a mutual capacitance between the first electrode and the second electrode, a parasitic capacitance between the second electrode and the liquid crystal panel, and a parasitic capacitance between the second electrode and the dummy electrode is 0.8 pF to 2 pF.

19. The touch panel according to claim 18, wherein in each of the touch units, an area of the dummy electrode perpendicularly projected on the second substrate is approximately 0.5A to 0.86A.

20. The touch panel of claim 11, further comprising:
a hardened layer, disposed on the second polarizer, and a thickness of the hardened layer is 80 μm to 120 μm.

* * * * *